United States Patent [19]

Scatà et al.

[11] 4,115,319

[45] Sep. 19, 1978

[54] CATALYSTS AND CATALYST COMPONENTS FOR POLYMERIZING OLEFINS

[75] Inventors: Umberto Scatà; Luciano Luciani; Pier Camillo Barbé, all of Ferrara, Italy

[73] Assignee: Montedison S.p.A., Milan, Italy

[21] Appl. No.: 724,361

[22] Filed: Sep. 17, 1976

[30] Foreign Application Priority Data

Sep. 19, 1975 [IT] Italy .............................. 27438 A/75

[51] Int. Cl.$^2$ ................................ C08F 4/64
[52] U.S. Cl. ............................ 252/429 B; 252/431 R; 252/431 C; 252/431 N; 252/431 P; 526/139; 526/140; 526/141; 526/142; 526/136; 526/128; 526/159; 526/166

[58] Field of Search ........... 252/429 B, 429 C, 431 R, 252/431 C, 431 N, 431 P

[56] References Cited

U.S. PATENT DOCUMENTS

| | | | |
|---|---|---|---|
| 3,644,318 | 2/1972 | Diedrich et al. | 252/429 C X |
| 3,819,599 | 6/1974 | Fotis et al. | 252/429 B X |
| 3,833,515 | 9/1974 | Amtmann et al. | 252/429 B |
| 3,878,124 | 4/1975 | Durand et al. | 252/429 B |
| 3,989,880 | 11/1976 | Berger et al. | 252/429 B X |

Primary Examiner—Patrick P. Garvin

[57] ABSTRACT

New catalyst components comprising compounds containing titanium, magnesium and halogens, and catalysts for polymerizing olefins obtained by mixing said components with organometallic Al compounds are disclosed.

11 Claims, No Drawings

CATALYSTS AND CATALYST COMPONENTS FOR POLYMERIZING OLEFINS

THE PRIOR ART

Italian Pat. No. 932,438, assigned to Montedison S.p.A., discloses catalysts which are highly active and exhibit good stereospecificity in the polymerization of alpha-olefins, i.e., olefins containing at least three carbon atoms, in particular propylene, and which consist of the products obtained by mixing an Al alkyl partially complexed with a Lewis base with a solid catalyst-forming component comprising compounds of at least Ti and Mg and optionally complexed with a Lewis base.

Such solid catalyst components are generally prepared by grinding a mixture of a halogenated Ti compound with a Mg dihalide and a Lewis base. In a variation, the Ti compound can be employed in the form of a pre-formed complex with the Lewis base.

To obtain good results by the use of those catalysts, it is necessary for the Mg dihalide to be present in a particular activated form. If the activated Mg dihalide is obtained by reaction of a Mg alcoholate with a halogenated Ti compound, for example $TiCl_4$, the catalysts obtained by mixing that reaction product with Al alkyls do not exhibit an entirely satisfactory stereospecificity and activity.

Analogously, if the activated Mg dihalide is obtained by reacting a compound of formula RMgX, in which R is a hydrocarbon radical and X is R or a halogen, with a halogenated Ti compound, the resulting solid components, when mixed with Al alkyls, yield catalysts which do not exhibit very high activity and stereospecificity.

THE PRESENT INVENTION

An object of this invention is to provide new solid catalyst components comprising Ti, Mg and halogens which, on being mixed with alkyl Al compounds, yield catalysts that exhibit high activity and a high degree of stereospecificity.

That and other objects are achieved by this invention in accordance with which we have found, surprisingly, that it is possible to polymerize the alpha-olefins, such as propylene, butene-1, etc., to high yields (in grams/gram of Ti used) of highly stereoregular polymers, even when the Ti-containing component is prepared starting with organic Mg compounds including the RMgX compounds and the Mg alcoholates.

When the monomer polymerized in contact with the catalysts prepared from the new catalyst components of this invention is ethylene, the polymer obtained is in the form of particles having a size comprised in a very narrow range.

The catalysts according to the present invention comprise the product obtained by mixing:

(A) an addition and/or substitution product of an electron-donor compound (such as a Lewis base) with an aluminum alkyl compound free of halogen atoms bound to the Al atoms, in which product the molar ratio between the electron-donor groups of the electron-donor compound which are reacted with the organometallic Al compound and the total moles of the Al compound is comprised between 0.1 and 1; with (B) a solid component comprising compounds containing Ti, Mg and halogens, in which the halogen/Mg ratio is not less than 1, said solid component being prepared by reacting a Ti compound with the solid halogenation product obtained by reaction of a halogenating agent different from the halogenated Ti compounds, with a Mg compound selected from the group consisting of:

(B.1) organic oxygenated magnesium compounds containing at least a Mg—O—R linkage wherein R is an alkyl-, cycloalkyl-, aryl- or acyl radical containing from 1 to 20 carbon atoms.

(B.2) organometallic Mg compounds containing at least a Mg—R linkage wherein R is an alkyl-, cycloalkyl- or aryl radical containing up to 20 carbon atoms; and (B.3) Mg compounds containing at least a

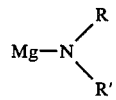

linkage, wherein R and R' are H or alkyl or aryl radicals, said solid component being further characterized in that it comprises an electron-donor compound (such as a Lewis base) in a quantity not more than 1 mole per g-atom of Mg.

The term "addition and/or substitution product" for component (A) means a product consisting of or comprising the complexes of the electron-donor compound with the aluminum alkyl compound and the compounds resulting from the reaction of aluminum trialkyl compounds with an electron-donor compound containing mobile hydrogen atoms that are capable of reacting with the aluminum trialkyl to bring about substitution reactions such as, for example:

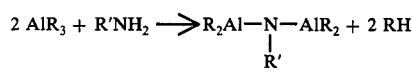

Any electron-donor compound (such as a Lewis base) can be used for preparing the addition and/or substitution compounds with the aluminum alkyl compounds.

Suitable electron-donor compounds are amines, amides, ethers, esters, ketones, nitriles, phosphines, stibines, arsines, phosphoramides, thioethers, aldehydes, alcoholates, amides and the organic acid salts of metals belonging to the first four Groups of the Mendelyeev Periodic System.

The best results, as regards both activity and stereospecificity, are achieved when esters of carboxylic acids or diamines, particularly esters of aromatic acids are used as the electron-donors.

Some typical examples of such compounds are: methyl- and ethyl-benzoate, methyl- and ethyl-p-methoxybenzoate, diethylcarbonate, ethylacetate, dimethylmaleate, triethylborate, ethyl-o-chlorobenzoate, ethylnaphthenate, ethyl-toluate, ethyl-p-butoxy-benzoate, ethyl-cyclohexanoate, ethyl-pivalate, N,N,N',N'-tetramethylendiamine, 1,2,4-trimethylpiperazine, 2,5-dimethylpiperazine and the like.

The electron-donor/aluminum trialkyl ratio is generally lower than 1 and, in the case of esters or diamines, it ranges from 0.1 to 0.8, and more particularly from 0.2 to 0.4.

Generally, the activity and stereospecificity of the catalysts are affected, in opposite ways, by the Lewis base/aluminum alkyl molar ratio, in the sense that the higher such ratio, the lower the activity, and vice-versa as regards the stereospecificity.

The aluminum alkyl compounds to be employed according to the present invention may be selected from a wide range of compounds.

Particularly suitable compounds are the aluminum trialkyls containing linear- or branched-chain alkyls having up to 20 carbon atoms or products of the reaction of said compounds with water, ammonia or primary amines and containing two or more aluminum atoms bound to one another by oxygen or nitrogen atoms.

Typical examples of such compounds are: triethyl aluminum, trimethyl aluminum, tri-n-butyl aluminum, tri-i-butyl aluminum, tri-n-propyl aluminum, triisohexyl aluminum, triisooctyl aluminum, $Al(C_{12}H_{25})_3$, $(C_2H_5)_2Al-O-Al-(C_2H_5)_2$,

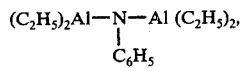

isoprenyl aluminum, and the like.

Aluminum alkyl compounds containing one alkoxy group having up to 20 carbon atoms can be used.

The catalysts of this invention can be prepared by various methods. The preferred method consists in pre-reacting the electron-donor with the aluminum alkyl compound, for a certain time, generally less than 1 hour, and then adding the component (A) thus obtained to the component (B). The aluminum alkyl compound, electron-donor and component (B) can be mixed simultaneously. Another method consists in reacting the aluminum alkyl compound with a mixture of component (B) with the electron-donor.

In all those methods the electron-donor/aluminum alkyl molar ratio is such that between 1% and 100%, preferably between 20% and 40% of the alkyl Al compound is combined with the electron-donor.

The Al/Ti atomic ratio in the catalysts is higher than 1 and can reach value as high as 10,000. Preferably, said ratio is comprised between 10 and 200.

The halogenating agents suitable for the preparation of the catalysts are different from the halogenated Ti compounds, are liquid or gaseous under the reaction conditions and are able to react with the initial magnesium compound to that the halogen atoms become bonded to the Mg atoms.

Halogenating agents which are particularly suitable include hydrogen halides for instance hydrogenchloride, phosphor pentachloride, thionyl chloride, thionyl bromide, sulfuryl chloride, phosgene nitrosyl, chloride, and the halides of organic and mineral acids. The halogens per se may also be used successfully.

Particularly suitable are silicium compounds selected from the compounds having formula $X_mSiR_n$, in which X is a halogen, R an alkyl, cycloalkyl, or aryl radical containing 1 to 20 carbon atoms; $n + m = 4$, $1 \leq m \leq 4$ and $0 \leq n \leq 3$.

Typical examples of these compounds are silicium tetrachloride, silicium tetrabromide and chlorosilanes, such as: $(CH_3)_3SiCl$, $(CH_3)_2SiCl_2$, $C_2H_5SiCl_3$, $(C_2H_5)_2SiCl_2$, $C_3H_7SiCl_3$, $(C_3H_7)_2SiCl_2$, $C_4H_9SiCl_3$, $(C_4H_9)_2SiCl_2$, trichlorovinylsilane, and the like.

It is possible to utilize, also, products prepared by halogenating polysiloxane, such as, for example, 1,3-dichlorotetramethyl-disiloxane, 1,5-dichloro-hexamethyl-trisiloxane and 1,7-dichloro-octamethyl-tetrasiloxane.

Also useful as halogenating agent are $RX_n$ compounds wherein R is a hydrocarbon radical, X is halogen, preferably chlorine or bromine, and n is an integer from 1 to 10.

Examples of said $RX_n$ compounds are carbon tetrachloride, carbon tetrabromide, chloroform, ethylene chloride, 1,1,1-trichloroethane.

Good results are obtained with halogenated organo-metallic compounds of Al, like $Al(C_2H_5)_2Cl$, $AlC_2H_5Cl_2$.

Examples of suitable halides of organic and inorganic acids are: $BCl_3$, $SbCl_5$, benzoyl chloride, acetyl chloride. In the halogenation of a Mg alcoholate with a halide of an organic acid, it is useful to carry out the reaction in the presence of a halogenated Si compound.

Magnesium compounds suitable for the preparation of the catalyst include:

Mg dialkoxides, for instance $Mg(OC_2H_5)_2$, $Mg(OC_3H_7n.)_2$, $Mg(O-C_3H_7i.)_2$, $Mg(O-C_4H_9n.)_2$, $Mg(OC_4H_9i.)_2$, Mg phenates or cresolates Mg monoalkoxides, for example the Mg-alkyl-alkoxides, or compounds of the formula XMgOR in which X is halogen or $(SO_4)_\frac{1}{2}$, $-OH$, $(CO_3)_\frac{1}{2}$, $(PO_4)_\frac{1}{3}$ or carboxylate groups Mg carboxylates, for example Mg acetate, Mg benzoate Mg enolates such as Mg acetylacetonate Grignard compounds, for example $ClMgC_2H_5$ and $ClMgC_4H_9n$ $MgR_2$ compounds like $Mg(C_2H_5)_2$ and $Mg(C_6H_5)_2$.

The Mg alcoholates can be used also in the form of complexes with alcoholates of other metals, for example $LiMg(OC_3H_7i.)_3$, $MgAl(OC_3H_7i.)_5$.

Mixtures of the aforesaid Mg compounds with inert organic or inorganic substances can be employed. Any electron-donor can be used to prepare component (B). Preferably, the Lewis bases are selected from the esters of inorganic and organic oxygenated acids and the polyamines. Typical examples of such compounds are the esters of aromatic carboxylic acids, such as benzoic acid, p-methoxybenzoic acid and p-toluic acid and particularly the alkyl esters of said acid; the alkylenediamines, such as, for example, N', N'', N''', N'''' tetramethylethylenediamine.

As electron-donor it is also possible to successfully employ silicium compounds, such as, for instance, vinyl-tris (beta-methoxyethoxy) silane or gamma-methacryloxypropyl-trismethoxysilane.

The electron-donor can be formed in situ during the halogenation reaction. For example, the halogenation reaction of a Mg alcoholate with a halogenated Si compound can be carried out in the presence of a halide of an organic acid, in particular of an aromatic acid such as benzoyl chloride, which forms a Lewis base by reaction with the compound of Mg and/or Si.

The titanium compounds to be used according to this invention are selected in particular from the halogenated Ti compounds including the halides and haloalcoholates. Non-halogenated tetravalent Ti compounds can also be used. Examples are the Ti tetra-alcoholates and Ti-tetrachloride and tetramide.

The titanium compound can be added to or during the reaction of the Mg compound with the halogenating agent when it is a titanium alcoholate such as, for example, $Ti(O-iC_3H_7)_4$, $Ti(O-nC_3H_7)_4$, $Ti(O-iC_4H_9)_4$, $Ti(O-nC_4H_9)_4$, $Ti(O-C_6H_5)_4$, $Ti_2O(O-iC_3H_7)_6$ and the like.

Preferably, the Ti compound is contacted with the prehalogenated Mg compound.

The reaction between the magnesium compound and the halogenating agent may be conducted either in the presence or absence of hydrocarbon solvents, at temperatures ranging from −15° C. to 200° C. and preferably from 50° C. to 150° C. If it is carried out in the presence of solvents, it is preferable to use high-boiling hydrocarbons (100°–170° C.) in particular iso-parafins containing more than 10 carbon atoms.

It has been found that the best results concerning the activity and stereospecificity of the catalyst are obtained when the halogenation product shows a X-ray spectrum comprising a halo whose maximum intensity is shifted with respect to the maximum intensity line present in the spectrum of the Mg dihalides. In the case of $MgCl_2$ the maximum intensity line is located at a interplanar distance d of 2.56 A for rhomboedrical $MgCl_2$ and 2.75 A for hexagonal $MgCl_2$.

Halogenation products having said characteristics can be obtained by reacting the Mg compounds with $SiCl_4$ at a temperature ranging from 60° to 100° C. for more than three hours.

In general, during the halogenation reaction, the halogen/magnesium atomic ratio is higher than 2:1. The electron-donor can be added to the Mg compound before, during or after the halogenation reaction. The Mg compound/electron-donor molar ratios are equal to or higher than 1 and preferably between 2 and 10.

The reaction of the halogenated Mg compound with the Ti compound is conducted at temperatures ranging in general from 20° to 150° C. More particularly, when $TiCl_4$ is used, it is preferable to carry out the reaction by suspending the halogenated Mg compound in $TiCl_4$ and heating the suspension at a temperature between 20° and 136° C.

The Ti/Mg atomic ratio in the reaction of the Ti compound with the halogenated Mg compound is higher than 1 and preferably comprised between 2 and 50.

According to a presently preferred embodiment of the present invention, the Mg compound and the halogenating agent are reacted in the presence of a Lewis base, at a temperature ranging, preferably, from 50° to 170° C. The reaction product is then treated with a strong excess of $TiCl_4$, at a temperature ranging from 60° to the boiling point of $TiCl_4$ (136° C.); after removal of the excess $TiCl_4$ at a temperature higher than 50° C., and washing with a hydrocarbon solvent to eliminate the unreacted $TiCl_4$, the solid catalyst component is obtained.

It has been found, additionally, and this is another feature of the present invention, that it is possible to further improve the activity of the present catalysts by preparing component (B) in the presence of a silicium compound, either polymeric or not, containing the group

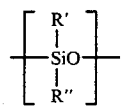

in which R′ and R″ are the same or different hydrocarbon radicals, selected in particular from the alkyl radicals containing 1 to 6 carbon atoms and from the aryl radicals containing 6 to 10 carbon atoms, or R′ is hydrogen.

The silicium compound may be employed both during the reaction between the Mg compounds and halogenated Si compound, and after such reaction (before or after the reaction with the Ti compound).

The Mg/Si atomic ratio is generally lower than 2, preferably ranging from 0.1 to 1.

The catalysts according to the invention may be used to polymerize ethylene or alpha-olefins, i.e., olefins containing at least three carbon atoms, such as propylene, butene-1, 4-methylpentene-1 and the like; or to copolymerize propylene or other alpha-olefins with one another and/or with smaller amounts of ethylene.

When ethylene is to be polymerized, it is convenient to use, instead of component (A), an aluminum trialkyl or an alkyl-aluminum halide not complexed with an electron-donor.

The polymerization conditions are conventional and comprise temperatures ranging from −80° to +150° C, preferably from 40° to 100° C., at partial pressures of the alpha-olefins higher than atmospheric pressure. Polymerization may be conducted in a liquid phase, either in the presence or in the absence of an inert hydrocarbon diluent, or in gas phase.

Particularly good results are achieved, in the polymerization of propylene, by operating in the presence of an aliphatic or aromatic inert hydrocarbon diluent, liquid under the polymerization conditions, or by operating in liquid propylene as reaction medium.

The following examples are given to illustrate the invention in greater detail and not intended to be limiting.

In the examples the melt-flow index (MIL) was determined according to ASTM D-1238/73; the flexural rigidity was measured according to ASTM D-747/70 on specimens prepared by molding in a plate press at 200° C. and by annealing for 2 hours at 140° C.

The apparent density (bulk density), was always determined on the polymer in powder form.

EXAMPLE 1

(a) Preparation of the catalyst 13.91 g of $Mg(OC_2H_5)_2$ were mixed with 29.8 g of γ methacryloxypropyl-trimethoxy-silane and 40.8 g of $SiCl_4$ at 62° C. for 1.5 hours.

The resulting product was treated with 240 ml of $TiCl_4$ at 136° C. for 1.5 hours. The products dissolved in $TiCl_4$ were removed in hot conditions by decantation and siphoning. The solid residue was treated again with 240 ml of fresh $TiCl_4$ at 136° C. for 30 minutes. After hot-removal of $TiCl_4$, by decantation and filtration, the solid residue was repeatedly washed with n-hexane to eliminate excess $TiCl_4$. It was then dried under vacuum at 55° C., to obtain a solid product, the elemental analysis of which gave the following results:

Mg = 12.52% by weight,
Ti = 3.6% by weight,
Cl = 52.6% by weight.

(b) Polymerization of propylene in a solvent 217 mg of the solid product (Example 1a) were introduced into a stainless steel autoclave, having a 2.5 l capacity and containing 1 liter of n-heptane and 1.135 g of $Al(C_2H_5)_3$ premixed with 572 mg of ethylanisate. Polymerization was conducted at 60° C. at a pressure of 5 kg/cm² gauge with propylene and hydrogen (1.5% by vol. of the gas phase) for 5 hours. The pressure was kept constant by continuous feeding of propylene.

At the conclusion, after removal of the solvent by stripping with vapor, 314 g of dry polypropylene in particle form were obtained. The yield was 40,200 g of polymer/g of Ti. The residue after extraction with boiling heptane was 89.5%.

The polymer was also characterized by the following properties:

bulk density: 0.41 kg/l
intrinsic viscosity: 2.3 dl/g
melt-flow index: 1.3 g/10'
flexural rigidity: 12,200. kg/cm$^2$.

(c) Polymerization of propylene in a liquid monomer 10 kg of propylene, 12.5 g of $Al(C_2H_5)_3$ in 90 ml of n-heptane, 7.2 g of ethylanisate in 120 ml of n-heptane, 720 mg of the solid product prepared according to Example (1a) in 130 ml of n-heptane and 15 Nl of hydrogen were introduced into a stainless steel autoclave having a capacity of 30 l.

The polymerization temperature was brought to 65° C. and the pressure was adjusted at 26.5 kg/cm$^2$g.

After 5 hours, and after removal of excess propylene 2.85 kg of polypropylene in particle form were obtained. The yield was 110,000 g of polymer/g of Ti. The residue after extraction with boiling heptane was equal to 88.5%.

The polymer was further characterized by the following properties:

bulk apparent density: 0.40 kg/l
intrinsic viscosity: 1.9 dl/g
melt-flow index: 3.2 g/10'
flexural rigidity: 12,755. kg/cm$^2$.

The above described polymerization test (1c) was repeated, but using 7.74 g of ethylanisate and 730 mg of the solid product prepared according to Example (1a). The following results were obtained:

yield: 72,300 g of polymer/g of Ti,
residue after extraction with boiling heptane: 90.5%.

The polypropylene, obtained in particle form, was also characterized by the following properties:

bulk density: 0.35 kg/l
intrinsic viscosity: 1.7 dl/g
melt-flow index: 5.7 g/10'
flexural rigidity: 14,130. kg/cm$^2$.

(d) Polymerization of ethylene in a solvent 20.3 mg of the solid product prepared according to Example (1a) were introduced into a stainless steel, 2.5-liter autoclave containing 1 liter of n-hexane and 2 g of $Al(i-C_4H_9)_3$.

Polymerization was conducted at 85° C at a partial pressure of ethylene of 6 kg/cm$^2$g. and at a partial hydrogen pressure of 7 kg/cm$^2$ g. for 4 hours.

At the conclusion, after evaporation of the solvent in hot conditions and under vacuum, 284 g of polyethylene in particle form, free from powder, were obtained. The yield was 340,000 g of polymer/g of Ti. The polymer was further characterized by the following properties:

bulk density: 0.37 kg/l
particles average diameter: 354μ
E grade: 27.6 g/10'

EXAMPLE 2

(a) Preparation of the catalyst 27.7 g of $Mg(OC_2H_5)_2$ were treated with 30.6 g of $SiCl_4$ and 3.37 g of $C_6H_5COCl$; this mixture was gradually heated to 155° C. and kept at such temperature for 2.5 hours. The resulting semi-solid product was hot-treated, at 136° C., with 240 ml of $TiCl_4$ for 1.5 hours. The products dissolved in $TiCl_4$ were removed in hot conditions by filtering and successive washing with 200 ml of n-hexane. The residual solid product was treated again with 200 ml of boiling $TiCl_4$ for 1 hour. Subsequent steps of the process were as described in Example (1a).

The elemental analysis of the solid product thus obtained gave the following results:

Mg = 16.45% by weight,
Ti = 2.70% by weight,
Cl = 58.15% by weight.

(b) Polymerization of propylene in a solvent

Example (1b) was repeated, using 234 mg of the solid product prepared according to Example (2a), 1.135 g of $Al(C_2H_5)$ and 572 mg of ethylanisate. 245 g of dry polymer, having a residue of 92% on extraction with boiling heptane, were thus obtained. The yield was 38,800 g of polypropylene/g of Ti in 5 hours. As in the foregoing Examples, the polymer was subjected to the same tests, and was found to have the following properties:

bulk density: 0.45 kg/l
intrinsic viscosity: 2. dl/g
melt-flow index: 5.1 g/10'
flexural rigidity: 13,770. kg/cm$^2$ (c) Polymerization of propylene in a liquid monomer Example (1c) was repeated, employing 12.5 g of $Al(C_2H_5)_3$, 7.2 g of ethylanisate and 798 mg of the solid product prepared according to Example (2a). In this way, 1.95 kg of polypropylene, having a residue after the extraction with boiling heptane of 91%, were obtained. The yield was 90,500 g of polymer/g of Ti. The polypropylene was also characterized by the following properties:

bulk density: 0.360 kg/l
intrinsic viscosity: 1.7 dl/g
melt-flow index: 4.9 g/10'
flexural rigidity: 13,350. kg/cm$^2$.

EXAMPLE 3

(a) Preparation of the catalyst 27.6 g of $Mg(OC_2H_5)_2$ were mixed with 29 g of trichlorovinylsilane ($Cl_3Si\ CH=CH_2$) and 7.2 g of ethylbenzoate. The mixture was gradually heated and the temperature was kept at 158° C. for 2 hours. The solid product thus obtained was thereafter treated with 240 ml of boiling $TiCl_4$ for 2 hours. Subsequent steps were as described in Example (1a).

The elemental analysis of the product so obtained gave the following results:

Mg = 18.14% by weight;
Ti = 2.45% by weight;
Cl = 64.4% by weight.

(b) Polymerization of propylene in a solvent

Example (1b) was repeated, using 204 mg of the solid product prepared according to Example (3a), 1.135 g of Al($C_2H_5$)$_3$ and 572 mg of ethylanisate. 275 g of dry polypropylene were thus obtained, having a residue, after the extraction with boiling heptane, of 87.5%. The yield was 55,000 g of polymer/g of Ti. The polymer was furher characterized by the following properties:

bulk density: 0.39 kg/l
intrinsic viscosity: 1.9 dl/g
melt-flow index: 3.2 g/10'
flexural rigidity: 11,050. kg/cm$^2$.

(c) Polymerization of propylene in a liquid monomer

Example (1c) was repeated employing 12.5 g of Al($C_2H_5$)$_3$, 7.2 g of ethylanisate and 730 mg of the solid product prepared according to Example (3a). 2.5 kg of polypropylene were thus obtained, having a residue to the extraction with boiling heptane, of 84%, an intrinsic viscosity of 1.8 dl/g, a melt-flow index of 4.7 g/10', a bulk density of 0.39 kg/l and a flexural rigidity of 10,530 kg/cm$^2$. The yield was 140,000 g of polymer/g of Ti.

On repeating Example (3c), using 720 mg of solid component, 12.5 g of Al($C_2H_5$)$_3$ and 7.74 g of ethylanisate, 1.6 kg of polypropylene were obtained. The residue of the extraction with boiling heptane amounted to 85.5% of the total (crude) polymer. The yield was 90,600 g of polymer/g of Ti, and the polymer was further characterized by the following properties:

bulk density: 0.40 kg/l
intrinsic viscosity: 1.9 dl/g
melt-flow index: 3.4 g/10'
flexural rigidity: 11,370. kg/cm$^2$.

EXAMPLE 4

(a) Preparation of the catalyst 240 ml of a heptane solution of 16.97 g of dissolved Mg(n-$C_4H_9$)$_2$ were added to 18.8 ml of a solution containing 22 g of SiCl$_4$ and 3.88 g of ethylbenzoate, in 10 minutes, at room temperature, under stirring. The temperature was then raised to 95° C. and maintained at 95° C. for 2 hours. Successively, 22 g of SiCl$_4$ were gradually added, heating and stirring being carried on for another 2 hours.

A white microcrystalline precipitate was separated from the reaction mass by decantation in the cold. The supernatant solution was siphoned and the precipitate was washed with n-heptane to remove excess SiCl$_4$. After filtration, the solid residue was treated with 240 ml of boiling TiCl$_4$ for 2 hours, and then hot-filtered, after which the solid residue was subjected to two consecutive one-hour treatments with equal amounts of hot TiCl$_4$, with hot-filtration after each such treatment. The solid residue was treated again in hot conditions for two consecutive times, and for 1 hour each time, with analogous amounts of TiCl$_4$.

Following the last hot-filtration, the solid residual product was repeatedly cold-washed with n-hexane to remove any trace of free TiCl$_4$. It was then dried under vacuum at 50° C. The elemental analysis of the solid product gave the following results:

Mg = 18.8% by weight;
Ti = 3.% by weight;
Cl = 59.85% by weight.

(b) Polymerization of propylene in a liquid monomer

Example (1c) was repeated, employing 970 mg of the solid product prepared according to Example (4a), 12.5 g of Al($C_2H_5$)$_3$ and 6.36 g of ethylanisate.

1.12 kg of polypropylene in particle form, having a particle size comprised in a narrow range, and a residue of the extraction with boiling heptane of 79.5%, were thus obtained. The yield was 38,400 g of polymer/g of Ti. The polymer was further characterized by the following properties:

bulk density: 0.31 kg/l
intrinsic viscosity: 1.7 dl/g
melt-flow index: 5.4 g/10'
flexural rigidity: 10,000. kg/cm$^2$.

When Example (4b) was repeated but using 1.1 g of solid product, 12.5 g of Al($C_2H_5$)$_3$ and 7.2 g of ethylanisate, 650 g of polypropylene in particle form were obtained, having a particle size comprised in a narrow range. On extraction with boiling heptane the residue (polypropylene insoluble in boiling heptane) amounted to 82.5% of the total polymerizate. The yield was 19,700 g of polymer/g of Ti.

The polymer was also characterized by the following properties:

bulk density: 0.30 kg/l
intrinsic viscosity: 1.5 dl/g
melt-flow index: 7.8 g/10'
flexural rigidity: 11,800. kg/cm$^2$.

(c) Polymerization of ethylene in a solvent 26.7 mg of the solid product prepared according to Example (4a) were introduced into a stainless steel, 25-liter autoclave containing 1 liter of n-hexane and 2 g of Al(i-$C_4H_9$)$_3$. Proceeding as in Example (1d), 255 g of polyethylene in the form of particles and free from powder were obtained. The yield was 318 kg of polymer/g of Ti.

The polymer was further characterized by the following properties:

bulk density: 0.37 kg/l
particles' average dia.: 333$\mu$
grade E: 49.2 g/10'

EXAMPLE 5

(a) Preparation of the catalysts 13.88 g of Mg(O$C_2H_5$)$_2$ were mixed with 14.7 g of Cl$_3$Si$C_2H_5$ and 6.34 g of vinyl-tris-(beta-methoxy-ethoxy)-silane. The mixture was gradually heated to 155° C. and kept at that temperature for 2 hours. After cooling, semi-solid paste was obtained. It was treated with 240 ml of TiCl$_4$ at 136° C. for 2 hours. The unreacted TiCl$_4$ was decanted and siphoned in hot conditions. The solid residue was subjected to two successive one-hour treatments with equal amounts of boiling TiCl$_4$.

By operating according to Example (1a), a solid product was obtained which, on elemental analysis, gave the following results:

Mg = 19.6% by weight,
Ti = 2.85% by weight,
Cl = 68.15% by weight.

(b) Polymerization of propylene in a solvent

Example (1b) was repeated, employing 229 mg of the solid product prepared according to Example (5a), 1.135 g of Al($C_2H_5$)$_3$ and 572 mg of ethylanisate. By operating in this way it was possible to obtain 135 g of polypropylene, having a residue after the extraction with boiling heptane equal to 77.5%, the yield being 20,700 g of the polymer/g of Ti in 5 hours.

(c) Polymerization of propylene in a liquid monomer

Example (1c) was repeated, employing 850 mg of the solid product prepared according to Example (5a), 12.5 g of Al($C_2H_5$)$_3$ and 7.2 g of ethylanisate. 1.28 kg of polypropylene having a residue after the extraction with boiling heptane of 85%, were thus obtained. The yield was 52,800 g of polymer/g of Ti. The polymer was further characterized by the following properties:

bulk density: 0.39 kg/l
intrinsic viscosity: 1.2 dl/g
melt-flow index: 7.5 g/10'
flexural rigidity: 11,050. kg/cm$^2$.

EXAMPLE 6

(a) Preparation of the catalyst 13.75 g of Mg(O$C_2H_5$)$_2$ were mixed with 19.62 g of $Cl_3SiC_2H_5$, 3.38 g of benzoyl chloride and 3.38 g of polydimethylsiloxane (viscosity: 100 Cst). The mixture was gradually heated to 155° C. under stirring, and kept at that temperature for 2 hours. By operating according to the modalities of Example (5a), a solid product was obtained, which on elemental analysis gave the following results:

p1 Mg = 21.6% by weight,
Ti = 1.25% by weight,
Cl = 68.95% by weight.

(b) Polymerization of propylene in a solvent

Operating as in Example (1b), using 234 mg of the solid product prepared according to Example (6a), 1.135 g of Al($C_2H_5$)$_3$ and 572 mg of ethylanisate, 276 g of polypropylene in particle form, free from powders, were obtained. The residue of the extraction with boiling heptane was equal to 86.5%, the yield being of 94,500 g of polymer/g of Ti in 5 hours. The polymer was further characterized by the following properties.

bulk density: 0.42 kg/l
intrinsic viscosity: 1.9 dl/g
melt-flow index: 4.7 g/10'
flexural rigidity: 9,760. kg/cm$^2$.

(c) Polymerization of propylene in a liquid monomer

Example (1c) was repeated, using 815 mg of the solid product prepared according to Example (6a), 12.5 g of Al($C_2H_5$)$_3$ and 7.2 g of ethylanisate. 2.35 kg of polypropylene in the form of particles and free from powder were obtained. The residue of the extraction with boiling heptane amounted to 86%. The yield was 230,000 g of polymer/g of Ti and the polymer was also found to have the following properties:

bulk density: 0.47 kg/l
intrinsic viscosity: 1.8 dl/g
melt-flow index: 3. g/10'
flexural rigidity: 10,300. kg/cm$^2$.

EXAMPLE 7

(a) Preparation of the catalyst

Example (6a) was repeated, but using 1.68 g of benzoyl chloride and 13.73 g of polydimethylsiloxane. The solid product obtained gave, on elemental analysis, the following results:

Mg = 19.4% by weight,
Ti = 1.55% by weight,
Cl = 65.% by weight.

(b) Polymerization of propylene in a solvent

Operating as in Example (1b), using 221 mg of the solid product prepared according to Example (7a), 1.135 g of Al($C_2H_5$)$_3$ and 572 mg of ethylanisate, there were obtained 270 g of polypropylene in the form of particles free from powder. Extraction of the total (crude) polypropylene with boiling n-heptane left a residue equal to 81.5%. The yield was 78,800 g of polymer/g of Ti in 5 hours. The residue also exhibited the following properties:

bulk density: 0.44 kg/l
intrinsic viscosity: 1.3 dl/g
melt-flow index: 13.2 g/10'
flexural rigidity: 13,500. kg/cm$^2$.

(c) Polymerization of propylene in a liquid monomer

Example (1c) was repeated, employing 740 mg of the solid product prepared according to Example (7a), 12.5 g of Al($C_2H_5$)$_3$ and 7.2 g of ethylanisate. In this way, 1.67 kg of a particle from polypropylene, free from powder, were obtained. The residue of the extraction with boiling heptane amounted to 87.5% of the total (crude) polypropylene, the yield being of 145,500 g of polymer/g of Ti. The polymer was further characterized by the following properties:

bulk density: 0.41 kg/l
intrinsic viscosity: 1.5 dl/g
melt-flow index: 9. g/10'
flexural rigidity: 14,700. kg/cm$^2$.

EXAMPLE 8

(a) Preparation of the catalyst 19.6 g of $Cl_3SiC_2H_5$ were mixed with 13.73 g of Mg(O$C_2H_5$)$_2$. The mixture was gradually heated to 145° C., and held at that temperature for 2 hours under stirring. The semi-fluid paste so obtained was repeatedly washed at 68° C. with n-hexane by decantation. The solid, suspended in 50 ml of n-hexane, was mixed with 1.81 g of ethyl benzoate and 1.81 g of polydimethylsiloxane (viscosity = 100 cst.).

The mixture was heated to 70° C. and kept at that temperature for 1 hour. It was evaporated under a moderate vacuum at 50° C., and the solid residue obtained was treated with 240 ml of boiling $TiCl_4$ for 2 hours. After hot-filtration, a new treatment with boiling $TiCl_4$ was carried out for 1 hour on the solid residue of the evaporation. After several washings in hot conditions (68° C.) with n-hexane, it was filtered under vacuum at 60° C. On elemental analysis, the final solid product gave the following results:

Mg = 17.16% by weight,
Ti = 2.2% by weight,
Cl = 60.65% by weight.

(b) Polymerization of propylene in a solvent

Example (1b) was repeated employing 187 mg of the solid product prepared according to Example (8a), 1.135 g of Al($C_2H_5$)$_3$ and 572 mg of ethylanisate. In this way it was possible to obtain 165 g of particle-form dry polypropylene. The residue after the extraction with boiling heptane was equal to 86.5% of the total polymerizate. The yield was 40,200 g of polymer/g of Ti.

The polymer was further characterized by the following properties:

bulk density: 0.40 kg/l
intrinsic viscosity: 1.6 dl/g
melt-flow index: 8.4 g/10'
flexural rigidity: 11,880. kg/cm$^2$.

(c) Polymerization of propylene in a liquid monomer

Operating as in Example (1c), there were used 740 mg of the solid product prepared according to Example (8a), 12.5 g of Al($C_2H_5$)$_3$ and 7.2 g of ethylanisate. 1.35 kg of particle-form polypropylene, which gave, on extraction with boiling heptane, a residue of 87%, were obtained. The yield was 82,800 g of polymer/g of Ti. The polymer was further characterized by the following properties:

bulk density: 0.41 kg/l
intrinsic viscosity: 1.4 dl/g
melt-flow index: 5.6 g/10'
flexural rigidity: 11,850. kg/cm$^2$.

EXAMPLE 9

Example (7b) was repeated but using 155 mg of the solid catalyst component prepared according to Example (7a), 1,135 g of Al($C_2H_5$)$_3$ and 640 mg of ethylanisate.

In this run, the polymerization was effected in n-heptane under a pressure of 10 kg/cm$^2$ gauge (1.5% by volume of hydrogen in the gas phase) for 6 hours. 260 g of polypropylene were obtained in particle form free from powder, with a yield of 108,000 g of polymer/g of Ti. The residue of the extraction with boiling heptane amounted to 85%. The polymer had a bulk density of 0.45 kg/l, a melt-flow index of 13.7 g/10' and a flexural rigidity of 12,440 kg/cm$^2$.

EXAMPLE 10

(a) Preparation of the catalyst 19.6 g of SnCl$_4$ were admixed to 13.73 g of Mg(O$C_2H_5$)$_2$. The resulting mixture was gradually heated to 145° C., and kept at such temperature for 2 hours under stirring. The semi-fluid paste so obtained was repeatedly washed at 68° C. with n-hexane by decantation.

The solid suspended in 50 ml of n-hexane was added with 1.81 g of ethyl benzoate and 1.81 g of polydimethylsiloxane (viscosity = 100 cst.). The mixture was heated to 70° C. and kept at such temperature for 1 hour. It was evaporated under a moderate vacuum at 50° C., and the solid residue obtained was treated with 240 ml of boiling TiCl$_4$ for 2 hours. After hot-filtration, a new treatment with boiling TiCl$_4$ was carried out for 1 hour on the solid residue. After several washings in hot conditions (68° C.) with n-hexane, it was filtered under vacuum at 60° C.

(b) Polymerization of propylene in a solvent

Operating as in Example (1b), employing 197 mg of the solid product prepared according to Example (10a), 1.135 g of Al($C_2H_5$)$_3$ and 572 mg of ethylanisate, there were obtained 170 g of dry polypropylene, which gave a residue on extraction with boiling heptane of 85%.

The polymer was also found to have the following properties:

bulk density: 0.41 kg/l
intrinsic viscosity: 1.6 dl/g
melt-flow index: 8.4 g/10'
flexural rigidity: 11,880. kg/cm$^2$.

(c) Polymerization of propylene in a liquid monomer

Operating as in Example (1c), using 780 mg of the solid product prepared according to Example (10a), 12.5 g of Al($C_2H_5$)$_3$ and 7.2 g of ethylanisate, there were obtained 1.40 kg of polypropylene, which gave a residue of 85% on extraction with boiling n-heptane. The polymer was further characterized by the following properties:

bulk density: 0.42 kg/l
intrinsic viscosity: 1.4 dl/g
melt-flow index: 5.6 g/10'
flexural rigidity: 11,850. kg/cm$^2$.

EXAMPLE 11

(a) Preparation of the catalyst 119 g SOCl$_2$ were admixed to 11.45 g of Mg(O$C_2H_5$)$_2$. The resulting mixture was gradually heated to 60° C., and kept at that temperature for 2 hours under stirring. The excess SOCl$_2$ was removed and the solid product so obtained was repeatedly washed at 68° C. with n-hexane by decantation.

The solid suspended in 100 ml of n-hexane was mixed with 3 g of ethyl benzoate and 1.81 g of polydimethylsiloxane (viscosity = 100 cst.). The mixture was heated to 70° C. and kept at such temperature for 1 hour. It was evaporated under a moderate vacuum at 50° C., and the solid residue obtained was treated with 240 ml of boiling TiCl$_4$ for 2 hours.

After hot-filtration, a new treatment with boiling TiCl$_4$ was carried out for 1 hour on the solid residue. After several washings in hot conditions (68° C.) with n-hexane, it was filtered under vacuum at 60° C.

(b) Polymerization of propylene in a solvent

Example (1b) was repeated, employing 190 mg of the solid product prepared according to Example (11a), 1.135 g of Al($C_2H_5$)$_3$ and 572 mg of ethylanisate. In this way it was possible to obtain 168 g of polypropylene which on extraction with boiling heptane, gave a heptane-insoluble residue amounting to 84% of the total (crude) polypropylene.

The polymer was further characterized by the following properties:

bulk density: 0.38 kg/l
intrinsic viscosity: 1.6 dl/g
melt-flow index: 8.4 g/10'
flexural ridigity: 11,880. kg/cm$^2$.

(c) Polymerization of propylene in a liquid monomer

Proceeding as in Example (1c), but using 770 mg of the solid product prepared according to Example (11a), 12.5 g of Al($C_2H_5$)$_3$ and 7.2 g of ethylanisate, 1.3 kg of particle-form polypropylene were obtained. On extraction with boiling heptane, the heptane-insoluble residue amounted to 85%. The polymer was also found to have the following properties:

bulk density: 0.40 kg/l
intrinsic viscosity: 1.4 dl/g
melt-flow index: 5.6 g/10'
flexural rigidity: 11,850. kg/cm².

EXAMPLE 12

(a) Preparation of the catalyst 11.45 g of Mg(O$C_2H_5$)$_2$ were mixed with 200 ml of n-hexane and 3 g of ethyl benzoate. The mixture was kept at 0° C., and gaseous anhydrous HCl was bubbled into it for one hour.

The solid product so obtained was filtered, repeatedly washed at 0° C. with n-hexane until the HCl was completely removed, and treated with 240 ml of boiling TiCl$_4$ for 2 hours.

After hot-filtration, the solid product was given another treatment with boiling TiCl$_4$ over a period of one hour, and then, after several washings in hot conditions (68° C.) with n-hexane, it was filtered under vacuum at 60° C.

(b) Polymerization of propylene in a solvent

Repeating Example (1b), and employing 185 mg of the solid product prepared according to Example (12a), 1.135 g of Al($C_2H_5$)$_3$ and 572 mg of ethylanisate, 160 g of polypropylene were obtained. On extraction with boiling heptane it gave a heptane-insoluble residue equal to 86% of the total (crude) polypropylene.

The polymer was further characterized by the following properties:

bulk density: 0.40 kg/l
intrinsic viscosity: 1.6 dl/g
melt-flow index: 8.4 g/10'
flexural rigidity: 11,880. kg/cm².

(c) Polymerization of propylene in a liquid monomer

Operating as in Example (1c), using 735 mg of the solid product prepared according to Example (12a), 12.5 g of Al($C_2H_5$)$_3$ and 7.2 g of ethylanisate, 1.3 kg of polypropylene were obtained. The residue remaining after extraction of the total (crude) polypropylene amounted to 87% thereof.

The polymer was also found to possess the following properties:

bulk density: 0.41 kg/l
intrinsic viscosity: 1.4 dl/g
melt-flow index: 5.6 g/10'
flexural rigidity: 11,850. kg/cm².

EXAMPLE 13

(a) Preparation of the catalyst 4 g of ClMgN($C_4H_9$)$_2$ were reacted in an inert gas atmosphere with a solution containing 0.615 ml of ethyl benzoate in 20 ml of SiCl$_4$ at 65° C. under stirring for 24 hours. The resulting white solid was filtered, washed with 200 ml of desulphurized anhydrous n-heptane, dried and reacted with 50 ml of TiCl$_4$ at 130° C. for 2 hours under stirring. TiCl$_4$ was removed by filtration and further 50 ml of same were added; the whole was allowed to react for further 2 hours at 130° C., whereupon it was filtered and washed at 80° C. with 300 ml of n-heptane. The solid thus obtained revealed, on analysis, a Ti content equal to 2.17% by weight and a Cl content of 68%.

(b) Polymerization of propylene in a solvent 5 millimoles (1 g) of aluminum triisobutyl were reacted at room temperature with 1.25 millimoles (187 mg) of methyl para-toluate in 80 ml of anhydrous desulphurized n-heptane for 5 minutes.

50 ml of such solution were contacted with a suitable amount of the catalyst component prepared as described hereinabove. The remaining 30 ml were diluted to 1,000 ml with n-heptane and introduced, under a nitrogen pressure, into a steel autoclave equipped with stirrer, thermoregulated at 40° C., whereinto propylene was made to flow.

In the same way the catalytic component suspension was then introduced. After closing of the autoclave, hydrogen was added up to a partial pressure of 0.1 atm., and then it was heated to 60° C. under contemporaneous feeding of propylene up to a total pressure of 5 atmospheres. Such pressure was kept constant throughout the polymerization by going on feeding the monomer. After 4 hours the polymerization was stopped and the polypropylene was isolated by treating it with methanol and acetone.

The results of the polymerization test are reported in Table 1.

EXAMPLE 14

3.3 g of Mg [N($C_4H_9$)$_2$]$_2$ were reacted in an inert gas atmosphere with a solution containing 0.52 ml of ethyl benzoate in 30 ml of SiCl$_4$ at 65° C. under stirring for 24 hours. The resulting white solid was filtered, washed with 200 ml of desulphurized anhydrous n-heptane, dried and caused to react with 50 ml of TiCl$_4$ at 130° C. for 2 hours under stirring.

TiCl$_4$ was removed by filtration and further 50 ml of same were added; it was allowed to react for further two hours at 130° C., then it was filtered and washed at 80° C. with 300 ml of n-heptane. The solid so obtained exhibited on analysis a Ti content equal to 2% and a Cl content of 65%.

A propylene polymerization test conducted by using such compound as catalyst component, under the same conditions as described in Example 13, gave the results reported in Table 1.

EXAMPLE 15

10.4 g of ClMgN($C_6H_5$)$_2$ were reacted in an inert gas atmosphere with a solution containing 1.44 ml of ethyl benzoate in 90 ml of SiCl$_4$ at 65° C. under stirring for 24 hours.

The resulting white solid was filtered, washed with 200 ml of desulphurized anhydrous n-heptane and reacted with 100 ml of TiCl$_4$ at 80° C. for two hours under stirring.

TiCl$_4$ was removed by filtration and further 100 ml of same were added; it was allowed to react for further 2 hours at 80° C., then it was filtered and washed at 80° C. with 300 ml of n-heptane. The solid thus obtained revealed, on analysis, a Ti content of 2.3% and a Cl content of 50.5%.

The propylene polymerization test was carried out by using such compound as catalytic component, under the same conditions as described in Example 13; the results obtained are those reported in Table 1.

TABLE 1

| CATA-LYST Example | POLYMERIZATION | | |
|---|---|---|---|
| | YIELD g of polypropylene g of Ti | $\eta_i$ (1) dl/g | Heptane (2) residue % |
| 13 | 56,000 | 2.12 | 89 |
| 14 | 56,000 | 1.6 | 85 |
| 15 | 38,000 | 1.6 | 91 |

(1) Inherent viscosity measured in tetrahydroaphthalene at 135° C (polymer concentration: 0.25 g in 100 ml of solvent).
(2) Residue to the extraction with boiling n-heptane.

EXAMPLE 16

(a) Preparation of the catalyst 11.44 g of Mg(OEt)$_2$ along with 136 g of SiCl$_4$ and 2.81 g of C$_6$H$_5$COCl were changed in the order into a pyrex glass 250 ml reactor, equipped with filtering fritted bottom.

The suspension was brought, under stirring, to 60° C. and kept at such such temperature for 21 hours. Subsequently it was filtered at 60° C. and evaporated to dryness.

The residual solid product was treated with 200 ml of TiCl$_4$ at 135° C. for 2 hours. A filtration was effected at 135° C., removing the unreacted TiCl$_4$. Successively a treatment with 200 ml of TiCl$_4$ at 135° C. for 1 hour was conducted. It was hot-filtered again and the residual solid was washed with hot hexane in order to remove the TiCl$_4$ in excess.

It was dried under vacuum at 60° C., thus obtaining a solid product, whose elemental analysis provided the following results:

Cl = 58.55% by weight
Ti = 2.05% by weight.

(b) Polymerization of Propylene in a Solvent 119 mg of the solid product described hereinabove were introduced into a stainless steel 2.5 l autoclave, containing 1 l of hexane and 1.135 g of Al-triisobutyl premixed with 344 mg of dimethyl para-toluate (solution at 20 g/100 ml of C$_6^+$). Polymerization was conducted at 60° C., at a pressure of 9 kg/cm$^2$ gauge, with propylene and hydrogen (1.5% by volume of the gas phase) for 4 hours.

The pressure was kept constant by continuous feeding of propylene.

At the conclusion, after removal of the solvent by stripping with vapor, 520 g of dry polypropylene were obtained, the yield being of 213,000 g of polymer/g of Ti, and the residue to the extraction with boiling heptane being of 92.5%.

EXAMPLE 17

(a) Preparation of the catalyst

The reactor described in Example 16 was fed, in the order, with: 11.50 g of Mg(OEt)$_2$, 136 g of SiCl$_4$ and 3 g of ethyl benzoate; this mixture was heated to 60° C., under stirring, and kept at such temperature for 24 hours consecutively. It was filtered at 60° C. to dryness of the solid, whereupon it was repeatedly washed with hot hexane removing SiCl$_4$ in excess.

The residual solid product was treated with 200 ml of TiCl$_4$ at 135° C. for 2 hours. The dissolved products as well as the TiCl$_4$ in excess were removed by filtration at 135° C. A second treatment was effected by employing 200 ml of TiCl$_4$ for 1 hour at 135° C. After removal by filtration of the whole amount of hot TiCl$_4$, the solid residue was repeatedly washed with hot hexane, in order to remove the TiCl$_4$ in excess.

It was dried under vacuum at 50° C., thus obtaining a solid product, whose elemental analysis provided the following results:

Ti = 1.95% by weight
Cl = 67.25% by weight.

(b) Polymerization of propylene in a solvent

It was operated as in Example 16(b), using 61.8 mg of the solid product prepared as described hereinbefore, 1.135 g of Al-triisobutyl and 274 mg of methyl p-toluate (solution at 20 g/100 ml of C$_6^+$).

By operating in this way, 331 g of dry "particle-form" polymer were obtained, the yield being of 275,000 g of polypropylene/g of Ti, and the residue to the extraction with boiling heptane being of 90.5%.

(c) Polymerization of propylene in a solvent 60 mg of the solid product prepared as described hereinbefore were introduced into a stainless steel 2.5 l autoclave containing 1 l of C$_6^+$ and 1 g of Al-triisobutyl premixed with 254 mg of methyl p-toluate (solution at 20 g/100 ml of C$_6^+$). Polymerization was conducted at 60° C., at a pressure of 5.4 kg/cm$^2$ gauge, with propylene and hydrogen (1.5% by volume of the gas phase) for 5 hours.

By operating in this way, 254 g of dry "particle-form" polymer were obtained, the yield being of 217,000 g of polypropylene/g of Ti, and the residue to the extraction in boiling heptane being equal to 92.5%.

EXAMPLE 18

(a) Preparation of the catalyst

A reactor like that described in Example 16(a) was charged, in the order, with 11.45 g of Mg(OEt)$_2$, 208.5 g of SnCl$_4$ and 3 g of ethyl benzoate. This mixture was heated, under stirring to 60° C. for 24 hours consecutively.

Successively it was filtered at 60° C. up to solid dryness, whereupon it was repeatedly washed with hot hexane in order to completely remove SnCl$_4$.

The residual solid product was treated with 200 ml of TiCl$_4$ at 135° C. for 2 hours. The dissolved products and the TiCl$_4$ in excess were removed by filtration at 135° C. A successive treatment with 200 ml of TiCl$_4$ was then carried out for 1 hour at 135° C. It was filtered again in hot conditions and the residual solid was washed with hot hexane in order to remove the TiCl$_4$ in excess.

It was dried under vacuum at 50° C., thus obtaining a solid product, whose elemental analysis provided the following results:

Cl = 70.10% by weight
Ti = 1.35% by weight.

(b) Polymerization of propylene in a solvent

It was operated as described in Example 16(b) by using 88 mg of the solid product prepared as described hereinbefore, 1 g of Al-triisobutyl and 254 mg of methyl p-toluate (solution at 5.5 g/100 ml of C$_6^+$).

By operating in this way, 366 g of dry polymer were obtained, the yield being of 308,000 g of polypropylene/g of Ti, and the residue to the extraction with boiling heptane being of 87.5%.

We claim:

1. Solid catalyst-forming components for use in preparing a catalyst for polymerizing ethylene and/or alphaolefins, comprising compounds containing Ti, Mg and halogens, in which the halogen/Mg atomic ratio is at least 1, said component being prepared by reacting a tetravalent Ti compound selected from the group consisting of Ti tetrahalides, Ti tetraalcoholates, Ti haloalcoholates, and Ti tetraamides, with the solid halogenation product containing halogen atoms bonded to Mg atoms obtained by reaction of a halogenating agent, different from the halogenated Ti compounds, with a Mg compound selected from the group consisting of (a) organic oxygenated Mg compounds of the formula

XMgOR in which R is an alkyl, aryl, cycloalkyl or acyl radical containing from 1 to 20 carbon atoms or —OR forms an enolate radical containing from 1 to 20 carbon atoms, and X is OR, halogen, $(SO_4)_{\frac{1}{2}}$, —OH, $(CO_3)_{\frac{1}{2}}$, $(PO_4)_{\frac{1}{3}}$, carboxylate or an alkyl, aryl, or cycloalkyl radical containing from 1 to 20 carbon atoms (b) organometallic compounds of the formula

YMgR' in which R' is an alkyl, aryl, or cycloalkyl radical containing from 1 to 20 carbon atoms, and Y is halogen or R'; and (c) Mg organic compounds of the formula

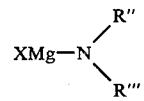

in which R" and R''' are hydrogen or alkyl or aryl radicals containing from 1 to 20 carbon atoms; and X is

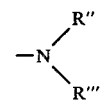

or has the same significance as in (a); said catalyst component being further characterized in that it contains an electron-donor in a quantity greater than 0.1 but not greater than 1.0 mole per g-atom of Mg.

2. The solid catalyst component of claim 1, in which the electron donor compound is bound to the halogenation product.

3. The solid catalyst-forming component of claim 1, in which the Mg compound is selected from the group consisting of dialcoholates having the formula $Mg(OR)_2$ in which R is an alkyl radical containing from 1 to 20 carbon atoms; Mg monoalcoholates having the formula R'MgOR, in which R is an alkyl radical containing from 1 to 20 carbon atoms and R' is chlorine; Grignard compounds having the formula RMgX, in which R is an alkyl radical containing from 1 to 20 carbon atoms and X is chlorine or bromine, and magnesium compounds of the formula $MgR_2$ in which R is an alkyl radical containing from 4 to 12 carbon atoms.

4. A solid catalyst-forming component according to claim 1, in which the halogenating agent is selected from the group consisting of halogenated polysiloxanes and halogenated silicium compounds having the formula $X_mSiR_n$ in which X is halogen, R is an alkyl, cycloalkyl, or aryl radical containing from 1 to 20 carbon atoms, and $n + m = 4$.

5. The solid catalyst component of claim 4, prepared in the presence of a polymeric silicium compound having the formula

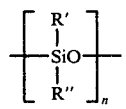

in which R' and R" are the same or different alkyl radicals containing from 1 to 6 carbon atoms or aryl radicals, or R' is hydrogen and n represents the degree of polymerization.

6. A solid catalyst-forming component according to claim 4, in which the halogenating agent is a halogenated silicium compound, $n + m = 4$, $1 \leq m \leq 4$ and $0 \leq n3$.

7. The solid catalyst component of claim 1, in which the electron-donor compound is selected from amongst the hydrocarbyl esters of inorganic and organic carboxylic acids and the hydrocarbyl polyamines.

8. The solid catalyst component of claim 1, in which the electron-donor compound is a silicium compound selected from the group consisting of vinyl-tris-(beta-methoxyethoxy) silane and gamma-methacryloxy-propyl-tris-(methoxy) silane.

9. Catalyst for polymerizing ethylene and/or alpha-olefins containing at least three carbon atoms, or mixtures of same, comprising the product of the reaction of:

(A) an addition and/or substitution product of an electron-donor compound with an organometallic aluminum compound free of halogen atoms bound to the Al atoms, and which is an alkyl Al compound selected from the group consisting of Al trialkyls, Al-alkoxy dialkyls, and Al alkyls containing two or more Al atoms bound to one another by an O or N atom, in which product the molar ratio between the electron-donor groups of the electron-donor compound which are reacted with the organometallic Al compound and the total moles of the Al compound is comprised between 0.01 and 1, with (B) the solid catalyst component of claim 1, in such quantity that the atomic ratio Al/Ti in the catalyst is between 1 and 10,000.

10. Catalyst for polymerizing ethylene or mixtures of olefins containing a major proportion of ethylene, comprising the product of the reaction of:

(A) an aluminum alkyl compound selected from the group consisting of Al trialkyls, Al-alkoxy-dialkyls and Al alkyls containing two or more Al atoms bound to one another by oxygen or nitrogen atoms with (B) the solid catalyst component of claim 1, in such quantity that the atomic ratio Al/Ti in the catalyst is between 1 and 10,000.

11. The solid catalyst component of claim 1, in which the tetravalent Ti compound used is $TiCl_4$.

* * * * *